Feb. 4, 1969  N. TUMMARELLO  3,425,474

MAGNETIC NUT FASTENING MEANS

Filed Oct. 31, 1966

INVENTOR.
NATALE TUMMARELLO
BY James P. Malone

United States Patent Office 3,425,474
Patented Feb. 4, 1969

3,425,474
MAGNETIC NUT FASTENING MEANS
Natale Tummarello, 2073 Hillside Ave.,
Bellmore, N.Y. 11710
Filed Oct. 31, 1966, Ser. No. 590,738
U.S. Cl. 151—41.7
Int. Cl. F16b *39/00;* E04b *1/38*
3 Claims

ABSTRACT OF THE DISCLOSURE

The present invention provides a hollow apertured or slotted member on the wall or stair or flush with the surface thereof. The opening in slotted aperture is several times the diameter of a bolt for easy sideway alignment and the slot runs the full length of casting for other alignment necessary. A plurality of magnetic nuts are mounted in the hollow member and held by magnetic force to the upper interior across the aperture of slots.

---

This invention relates to magnetic nut fastening means and more particularly to means for fastening wall panels or stair treads.

Masonry panels and stair treads are generally mounted by bolting them to tapped holes in a supporting structure. The supporting structure for wall panels would be a metal insert which is cemented in or otherwise mounted on the wall. Stair treads are similarly mounted. These inserts are fastened by bolting, cementing or with screws and it is practically impossible to locate the mounting holes accurately enough to match up the holes in the panels or stair treads which are precut in the factory.

Therefore there is a need for supporting means which are adjustable and self aligning so that when the bolts are inserted through the panels, the tapped holes on the supporting member may be moved to match up with the holes in the panels.

In the case of panels which are periodically worn out, for instance stair treads, it is desired that the panels be easily removable and replaced with little labor.

The present invention provides means for solving these problems by mounting a hollow apertured or slotted member on the wall or stair or flush with the surface thereof. The opening in slotted aperture is several times the diameter of bolt for easy sideway alignment and the slot runs the full length of casting for other alignment necessary. The hollow member is mounted along the line of the mounting holes. A plurality of magnetic nuts are mounted in the hollow member and held by magnetic force to the upper interior across the aperture or slots. When the panel is mounted and the bolt inserted, the nut is free to move with the bolt to facilitate the aligning. The bolt preferably has a drift pin extension which is smaller than the body of the bolt and which is unthreaded. The smaller diameter of the bolt "drift pin" will line up the hole for the thread and keeps the nut perpendicular. The nut can then be lined up by laterally moving the bolt, until the threaded portions of the nut and bolt line up.

Accordingly, a principal object of the invention is to provide new and improved means for mounting panels or stair threads.

Another object of the invention is to provide new and improved means for matching holes in panels with holes in mounting members.

Another object of the invention is to provide new and improved mounting means for panels having self aligning nut means.

Another object of the invention is to provide new and improved means for changing panels comprising a hollow apperture member of magnetic material, means to mount said aperture member on said supporting structure, a nut magnetically mounted inside said aperture member across the inside of said aperture and bolt means adapted to extend through said panels and engage said nut.

These and other objects of the invention will be apparent from the following specification and drawings of which:

Figure 1:
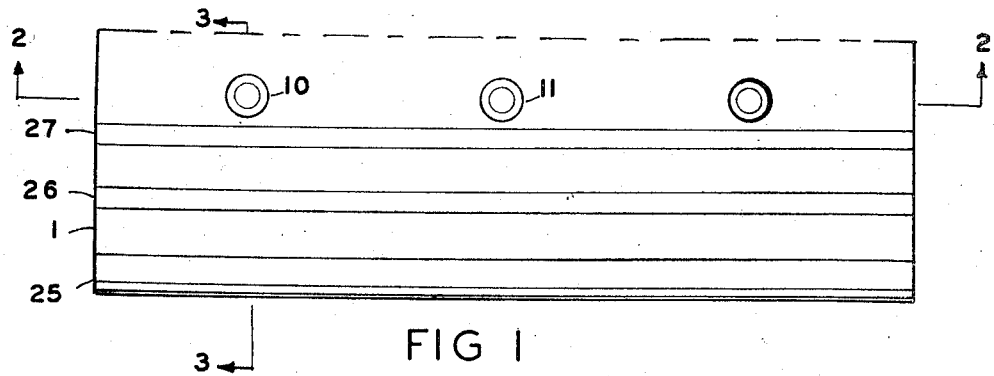
FIGURE 1 is a top view of a typical panel or stair tread.
Figure 2:
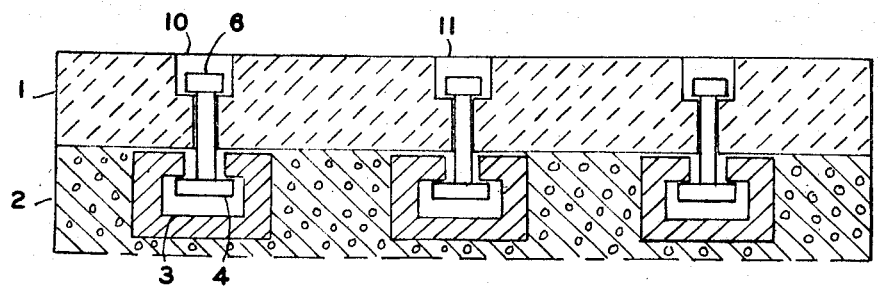
FIGURE 2 is a sectional view of FIGURE 1 taken along the line 2—2 of FIGURE 1.
Figure 3:
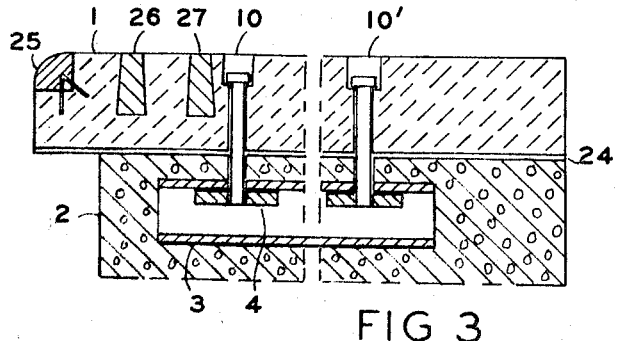
FIGURE 3 is a sectional view of FIGURE 1 taken along the line 3—3 of FIGURE 1.

Referring to FIGURES 1, 2, and 3 the invention is illustrated by mounting a panel 1 which may be a wall panel or stair tread on a supporting structure 2. The mounting means generally comprise a hollow slotted or otherwise apertured member 3 preferably of cast iron. This member is mounted on or in the supporting member by conventional means such as with cement, by screws, bolts or by welding. The slotted member is placed to line up with the precut holes 10, 11 in the panel. However, as previously discussed, it is not possible to line up these holes perfectly so that some self alignment must be performed. Magnetic nuts 4 are inserted in the hollow member and approximately placed under the present holes which are in the panel.

As shown in FIGURE 2 the magnetic nut 4 is held up by magnetic force against the upper inside surface of the holding member 3. The bolt 6 has a drift pin extension 6' and the nut 4 has a stepped aperture so that the upper portion of the aperture is bigger than the unthreaded portion. Therefore, when the bolt is inserted through the holes, if the nut does not line up, it will automatically be lined up by the drift pin extension by means of some adjustment movement of the bolt. The panels preferably have counter sunk holes for the bolt which will later be filled to enhance the appearance of the panel.

FIGURE 1 shows the top view of the panel which has a plurality of holes 10, 11, etc. FIGURE 2 shows a section through the holes 10, 11 illustrating the cast iron member 3 which is cemented into the supporting structure 14 which may be a wall or stair tread or a ceiling. The magnetic nut 4 is mounted approximately to line up with the hole 10 and nut 4 is held up to the hole member by magnetic attraction. The panel preferably has a counter sunk hole so that the heads of the bolts 6 may be sunk below the surface of the panel. The apertures may be then filled with a matching compound to enhance the appearance of the panels.

FIGURE 3 shows a sectional view of a typical stair tread. The hollow apertured member 3 is mounted in the stair supporting number 2 and bolts are mounted through mounting holes 10, 10'. In stair tread construction it is preferable to place a metal pan 24 preferably with stiffening members on top of the metal pan. The upper panel preferably also has lead inserts 25, 26, 27, to help provide a non-skid surface.

Figure 4:
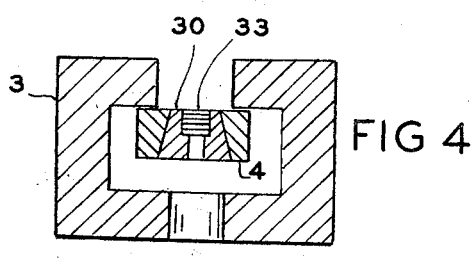
FIGURE 4 is a detail view of the magnetic nut with a machinable insert.

FIGURE 4 shows a typical nut construction. The body of the nut 4 is preferably made from a magnetic material such as Alnico. This material is difficult or impossible to machine or to thread. Therefore, a center insert 30 is poured or otherwise mounted in the nut. This insert may be metal epoxy compound such as commercially available, a poured metal or other equivalent. The insert permits easy machining and cutting of the threads.

Figure 5:
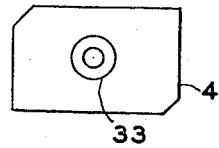
FIGURE 5 is a plan view of a nut.
Figure 6:
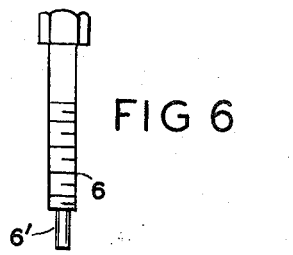
FIGURE 6 is a detail view of a bolt with drift pin extension.

FIGURE 6 shows a detail view of a bolt 6. The bolt has a typical drift pin extension 6 which is unthreaded, which is adapted to fit into the smaller portion 33 of the nut member. The nut is preferably rectangular as in FIGURE 5, and of such dimensions that it cannot rotate within the hollow mounting member after thread contact.

Therefore, when mounting the panels the nut members are lined up approximately with rough measurements, then the panels are applied and bolts inserted through the mounting holes. The holes in the panels are made preferably oversized so that the bolt can be wiggled in the hole so that the drift pin extension of the bolt will enter the aperture of the nut and the lateral movement of the bolt will cause the nut to line up so that the threaded portion will be perfectly aligned.

Many modifications may be made by those who desire to practice the invention without departing from the scope thereof which is defined by the following claims:

I claim:

1. Means for fastening panels on a supporting structure comprising, a hollow slotted aperture member of magnetic material, means to mount said aperture member on said supporting structure, a magnetic nut magnetically adjustably mounted inside said aperture and bolt means adapted to extend through said panel and engage said nut member across the inside of said aperture, said slotted aperture being considerably wider than the diameter of said bolt means but not as wide as said nut, to permit smoothly variable transverse and longitudinal adjustments of said nut within said hollow member, said nut being of magnetic material with a threaded insert of non-magnetic material.

2. Apparatus as in claim 1 wherein said non-magnetic material is an epoxy base material.

3. Apparatus as in claim 1 wherein said bolt means has a narrow unthreaded portion and said nut has a stepped aperture to assist in lining up said nut.

References Cited

UNITED STATES PATENTS

| 262,193 | 8/1882 | Wootten | 151—7 |
| 447,775 | 3/1891 | Higbee | 85—1 |
| 1,071,841 | 9/1913 | Whitman | 151—7 |
| 2,429,833 | 10/1947 | Luce | 85—1 |
| 2,737,268 | 3/1956 | Smith | 151—41.75 |
| 2,962,317 | 11/1960 | Monse | 151—37 |
| 3,119,430 | 1/1964 | Di Rico | 151—7 |
| 3,235,917 | 2/1966 | Skubic | 151—41.71 |

FOREIGN PATENTS 78,362   6/1955   Netherlands.

EDWARD C. ALLEN, *Primary Examiner.*

U.S. Cl. X.R.

52—710